United States Patent [19]

Budrys et al.

[11] 3,723,659

[45] Mar. 27, 1973

[54] GROUP HUNTING CIRCUIT

[75] Inventors: Ignas Budrys; Ernest O. Lee, Jr., both of Fairport, N.Y.

[73] Assignee: Stromberg-Carlson Corporation, Rochester, N.Y.

[22] Filed: Oct. 26, 1970

[21] Appl. No.: 83,938

[52] U.S. Cl. ............................179/18 HA, 179/18 D

[51] Int. Cl. ..............................................H04q 3/62

[58] Field of Search............179/18 HA, 18 D, 18 DA

[56] References Cited

UNITED STATES PATENTS

| | | | |
|---|---|---|---|
| 3,626,378 | 12/1971 | Salle et al. | 340/172.5 |
| 3,519,755 | 7/1970 | Allum et al. | 179/18 HA |
| 3,221,107 | 11/1965 | Seemann et al | 179/18 HA |
| 3,204,036 | 8/1965 | Bray et al. | 179/18 D |

*Primary Examiner*—Thomas W. Brown

*Attorney*—Craig, Antonelli, Stewart & Hill

[57] ABSTRACT

A group hunting circuit for a telephone system employs both consecutive and non-consecutive number hunting. During the consecutive hunting, when a pilot number of a hunting group is dialed and is found busy, the equipment automatically hunts in numerical sequence through the other lines of the group until an idle line is detected. The non-consecutive hunting arrangement permits a departure from one sequence of lines and continues sequential hunting beginning with another line. Skips may be strapped to specific numbers, whereby the equipment skips to a designated number and continues the sequential hunt. In this manner, the total number of lines consecutively tested may be maximized by inserting a skip at the last number of one sequence of lines and at the first number of another sequence of lines, so that the equipment hunts through the first sequence, skips to the first number in another sequence, and consecutively hunts through it.

37 Claims, 7 Drawing Figures

INVENTORS
IGNAS BUDRYS
ERNEST O. LEE, JR.

BY Craig, Antonelli, Stewart & Hill

ATTORNEYS

GROUP HUNTING CIRCUIT

The present invention is related to a group hunting circuit for an automatic telephone exchange, and particularly for a private branch automatic telephone exchange.

The object of a group hunting circuit is to make possible the connection between a caller and one of a group of called lines at a called station, where the calling party normally does not care which particular line is connected, as long as some line is connected to permit the establishment of a communication path between the caller and the called station.

Typically, group hunting circuits are employed where a large number of calling parties desiring communication with a specific station is anticipated. For example, at a credit service or an airline reservations desk, a plurality of lines are employed to handle a significant volume of calling customers. Normally, a single number is dialed and one of the non-busy lines is rung. The number of lines in a group of lines is normally limited and, as a result, when the scanning equipment has completed hunting through each of the lines in a group and has detected each line to be busy, a busy signal is returned to the calling party.

One of the disadvantages of the typical group hunting circuit is the limitation on the number of lines made available by a circuit. Typically, each line in a group of lines is strapped and the number of groups is limited. In a conventional arrangement, the equipment hunts through each line of a single group searching for an idle line, once a pilot line has been dialed. If no free line is detected, a busy signal is returned to the caller and a communication between the parties is prevented. Accordingly, it is an object of the present invention to provide a telephone system including a group hunting circuit which makes an additional number of lines available to the calling party, if all of the lines in a first group are detected to be busy.

It is another object of the present invention to provide a telephone system including a consecutive number hunting arrangement whereby any line in the hunting group may be individually dialed, while still providing consecutive hunting when the pilot number is dialed.

It is an additional object of the present invention to provide a consecutive group hunting circuit which may be expanded by providing non-consecutive skips between different groups of sequentially numbered lines.

It is a further object of the present invention to provide a group hunting circuit which includes both consecutive and non-consecutive hunting arrangements to allow the addition of a number of lines which is out of sequence to an existing consecutive group.

It is still another object of the present invention to provide a hunting circuit which permits consecutive number hunting to be carried out in ether a consecutive or non-consecutive order between different groups of lines.

It is still a further object of the present invention to provide a telephone system which permits totally non-consecutive number hunting within a group of lines.

It is still an additional object of the present invention to provide a telephone system having a group hunting circuit which is more efficient in operation and less complicated in construction due to the simplified gating and storage circuitry employed.

In accordance with one feature of the present invention, if the first (or pilot) number of a hunting group is dialed and that line is found to be busy, the hunting equipment will automatically hunt through the other lines of the group sequentially until it finds an idle line. If no idle line is detected, a busy signal will be returned to the calling party. Any line in a hunting group may be dialed individually, but hunting only occurs when the pilot number is dialed. Numbers in a group are consecutively numbered and may range in size from two to 10 lines, although no maximum limit is placed on the number of lines within a group. As many hunting groups as desired may be formed and a typical 10-line group may be broken up into several smaller hunting groups. A number of sequentially numbered hunting groups are created at the class of service panel in the exchange simply by marking the first line of a sequence of lines in each group with a "start line hunt" class of service and marking the last line of each group with an "end line hunt" class of service.

In accordance with another feature of the present invention, the consecutive number hunting feature is augmented by a non-consecutive number hunting feature in order to allow groups larger than 10 lines to be formed or to allow the addition of a number which is out of sequence with respect to an existing consecutive group. The non-consecutive feature is formed by means of "skips" between groups. Each skip is programmed by strapping a "skip from" and a "skip to" to a line number. Skips may be inserted anywhere within the lines of a group and may be allotted to a single group of lines to form one group of entirely non-consecutively hunted lines.

As a typical example of the use of the non-consecutive number hunting feature to enlarge a group of 10 lines to a group of 20 lines, a "skip from" would be strapped to the last line of one group of 10 lines and a "skip to" would be strapped to the first line of another group of 10 consecutive lines. As a result, the equipment would hunt through the 10 lines of the group headed by the pilot number and would skip from the 10th line of that group to the first line of another group of lines and continue consecutive hunting in the other group of lines.

An additional feature of the present invention resides in the manner in which consecutive and non-consecutive hunting is carried out. The consecutive hunting within a group of 10 lines is controlled by the units digit of a three-digit number. A counter is provided which counts through the group of 10 lines when a pilot number is called. If consecutive number hunting alone is employed, a busy signal will be returned to the caller, if no idle line is found after the counter completes its cycle. Where nonconsecutive strapping of jumps is employed, a digit transfer circuit will detect and carry out a "skip from" and "skip to" operation so that the "skip to" number may be substituted for the number being stored in a register. The counter will then commence counting until a free line is detected or until another jump is detected by the transfer circuit. Any number of skips or jumps may be employed, but capability is normally provided for six skips or jumps in view of the probability of the need for available lines and the economical saving of equipment.

These and other objects, features and advantages of the present invention will become more apparent from the following detailed description thereof, when taken in conjunction with the accompanying drawings, which illustrate one embodiment of the present invention and wherein.

Figure 4A:
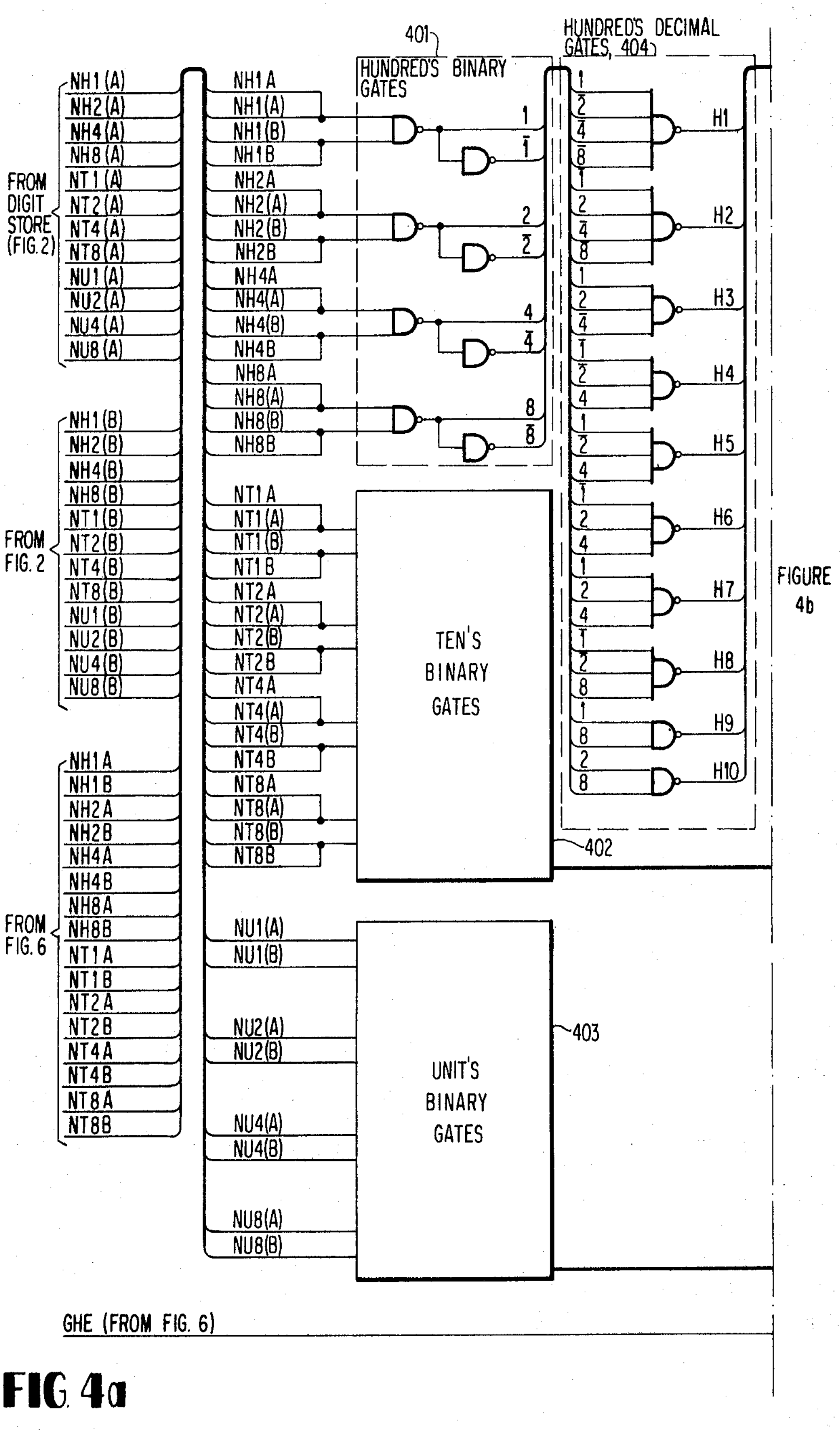
Figure 4B:
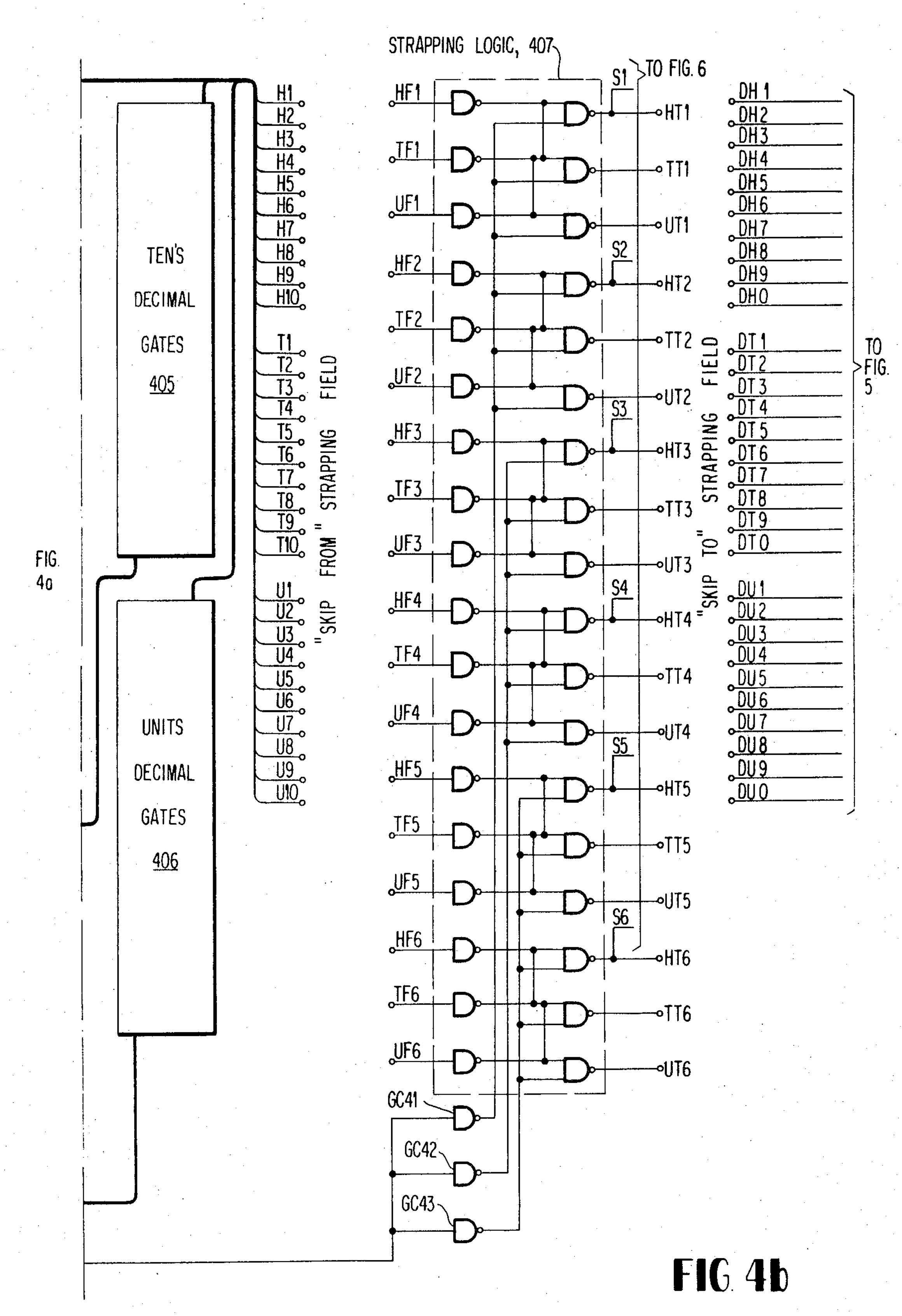

FIGS. 4, which consists of FIGS. 4*a* and 4*b*, 5 and 6, in combination, are schematic circuit diagrams of the digit transfer circuitry including the non-consecutive strapping, conversion, storage and control logic circuitry.

The principles of the present invention are described in detail below in association with an exemplary PBX telephone system of the common control type. Since the present invention is not restricted to use in association with this or any other particular telephone system, it should be understood that the specific telephone system described herein is presented only for purposes of facilitating an understanding of the basic principles of the present invention. Accordingly, only those detailed features of the disclosed common control system which are important to the operation of the present invention have been described in detail.

GENERAL SYSTEM DESCRIPTION

Figure 1:
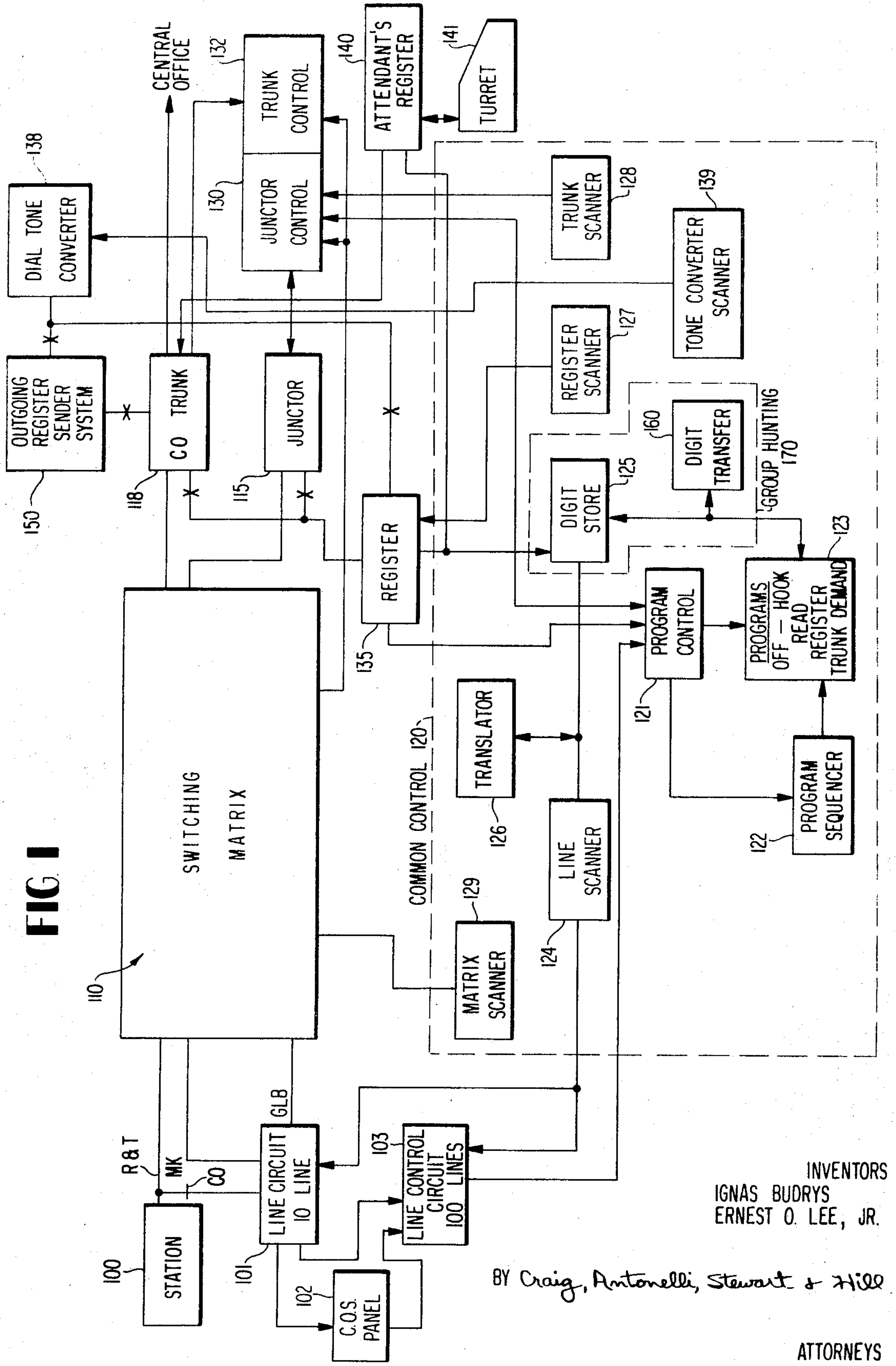
FIG. 1 is a schematic block diagram of a PABX common control telephone system including a group hunting circuit of the present invention.

FIG. 1 illustrates an overall block diagram of a common control PBX system capable of connecting one station to another station or to the central office via a trunk circuit under control of the common control circuit. The system provides a plurality of stations 100 (of which only a single station is illustrated in FIG. 1 for purposes of simplicity) with each group of ten stations 100 being serviced by a line circuit 101 associated with a particular input of the switching matrix 110. The switching matrix 110 is a typical matrix network formed of three stages of reed relay switches providing a plurality of paths between a given input connected to one of the plurality of stations 100 and a given output connectable to a junctor or a central office trunk 118. All of the switching functions of the system are controlled by the common control circuit 120 which performs the functions for an off hook program, the read register program and a trunk demand program. One or more junctor controls 130 and trunk controls 132 along with a plurality of registers 135 are also provided for purposes of effecting connection of a particular station requiring service to the common control equipment so that the operations necessary to the establishment of a comminication connection within the PBX or outside thereof to the central office may be performed. A class of service panel 102 is provided for each group of 100 lines and indicates for the respective stations served by the line circuit special classes of service which are available for the stations and particular equipment which may be available or used thereby, such as tone-dial equipment as opposed to rotary dial.

The common control 120 is divided into several separate functional circuits which serve to control the program of operations carried out to perform the switching processes including the path checking and selection required for connection of a station requesting service to a register or central office trunk. A line control circuit 103 accommodating ten line circuits 101 serves as an interface between the common control 120 and the individual line circuits 101. The common control 120 typically includes a program control 121 which selects the program to be run to satisfy the request for service and a program sequencer 122 and program circuit 123, which implement the program selected by the program control 121. The program control 121, program sequencer 122 and program circuit 123 may typically take the form of a wired logic or other programmed system of the type well known in the art. The various controls signals eminating from this program control area of the common control 120 have not been illustrated in detail in FIG. 1, but are shown in the subsequent figures where necessary for an understanding of the operation of the group hunting circuit of the present invention.

The common control 120 also includes a line scanner 124 which determines the line demanding service on an originating call and identifies and acts as a line marker when terminating a call. A translator 126 is also provided as part of the common control 120 and serves the functions normally associated with this element. A digit store circuit 125 and a digit transfer circuit 160 are associated with each other, wit register 135 and with the Read Register Program 123, so as to make up the group hunting circuit 170 of the present invention. The operation of digit store 125 and digit transfer 160 will be described in detail in connection with FIGS. 2 through 6. A register scanner 127 examines the status of the registers and register-senders to determine if an idle register or outgoing register-sender is available for use in connection with a calling station or to find the register demanding service to complete a call. A trunk scanner 128 and matrix scanner 129 are associated with the switching matrix 110, the trunk scanner 128 serving the junctors 115 and central office trunks 118 through the junctor control 130 or trunk control 132 to determine those which may be available to a calling station through the switching matrix 110. The matrix scanner 129 serves to scan the links in the switching matrix 110 in the process of establishing a path from a given calling station through the switching matrix, in accordance with a system disclosed in copending application Ser. No. 37,772, filed May 15, 1970, now U.S. Pat. No. 3,660,600, in the name of Ernest O Lee, Jr., and assigned to the same assignee as the present application. This copending application also includes a detailed description and illustration of the switching matrix 110 and the various elements including the junctor control 130 and trunk control 132 along with other elements required for the path finding operation. In order to provide attendant service in the system, an attendant's register 140 and turret 141 are connected to the central office trunks 118 and registers 135 to provide service for incoming and outgoing calls. Also associated with the central office trunks 118 is an outgoing register sender system 150.

Typical operation of the system shown in FIG. 1 is initiated by a subscriber at a given station 100 lifting the hand set of his telephone, which results in the closing of a direct current loop to the tip T and ring R leads of the line, thereby signalling the associated line circuit 101 of a demand for service. The demand is placed through the associated line control circuit 103 to the common control 129 for an off hook program, and the common control causes the scanner 124 to scan over the lines to identify the particular line requesting service. Upon identifying the line requesting service, a class of service check is made through the COS panel 102 to determine whether the last line has a rotary line class of service or a multi-frequency class of service information which is necessary to determine whether the tone dial converter 138 is necessary for the establishment of the call.

The common control 120 causes the line circuit 101 to place a negative potential mark on its mark lead, which is connected to an input of the switching matrix 110. The common control 120 then actuates the matrix scanner 129 initiating the path checking and selecting operation which will select a single path through the switching matrix 110 from the station 100 requesting service. The common control also causes the trunk scanner to scan over the junctor through a junctor control for an idle junctor, and the register scanner to select an idle register. The cross points of the selected matrix path are operated at this time, connecting the calling line through the junctor to the selected register. Dial tone is returned to the calling line from the register through the switching matrix and, at this time, the common control releases and is available to handle other requests for service.

After receiving dial tone, the subscriber dials one or more digits which are received and stored in the register 135. The common control analyzes the dialed digits as they are received to determine whether the call to be established is a local call, an outgoing trunk call or a special request for service.

In the case where a subscriber wishes to call a group of lines served by the group hunting feature of the present invention, after receiving dial tone, the subscriber dials the pilot number associated with the group of lines. The digits of the dialed number are stored in register 135 and subsequently delivered to digit store 125. After the register has requested service from the common control, the class of service check is made. When the dialed digits are associated with a group hunting sequence, a "start line hunt" or "end line hunt" will specify the group hunting class of service. Normally, the pilot number associated with a group of lines corresponds to a "start line hunt" of class service so that group hunting between consecutive lines may be initiated. Specific details of group hunting circuitry of the present invention are shown in FIGS. 2 through 6 and will be described in more detail hereinafter.

GROUP HUNTING CIRCUIT

Figure 2:
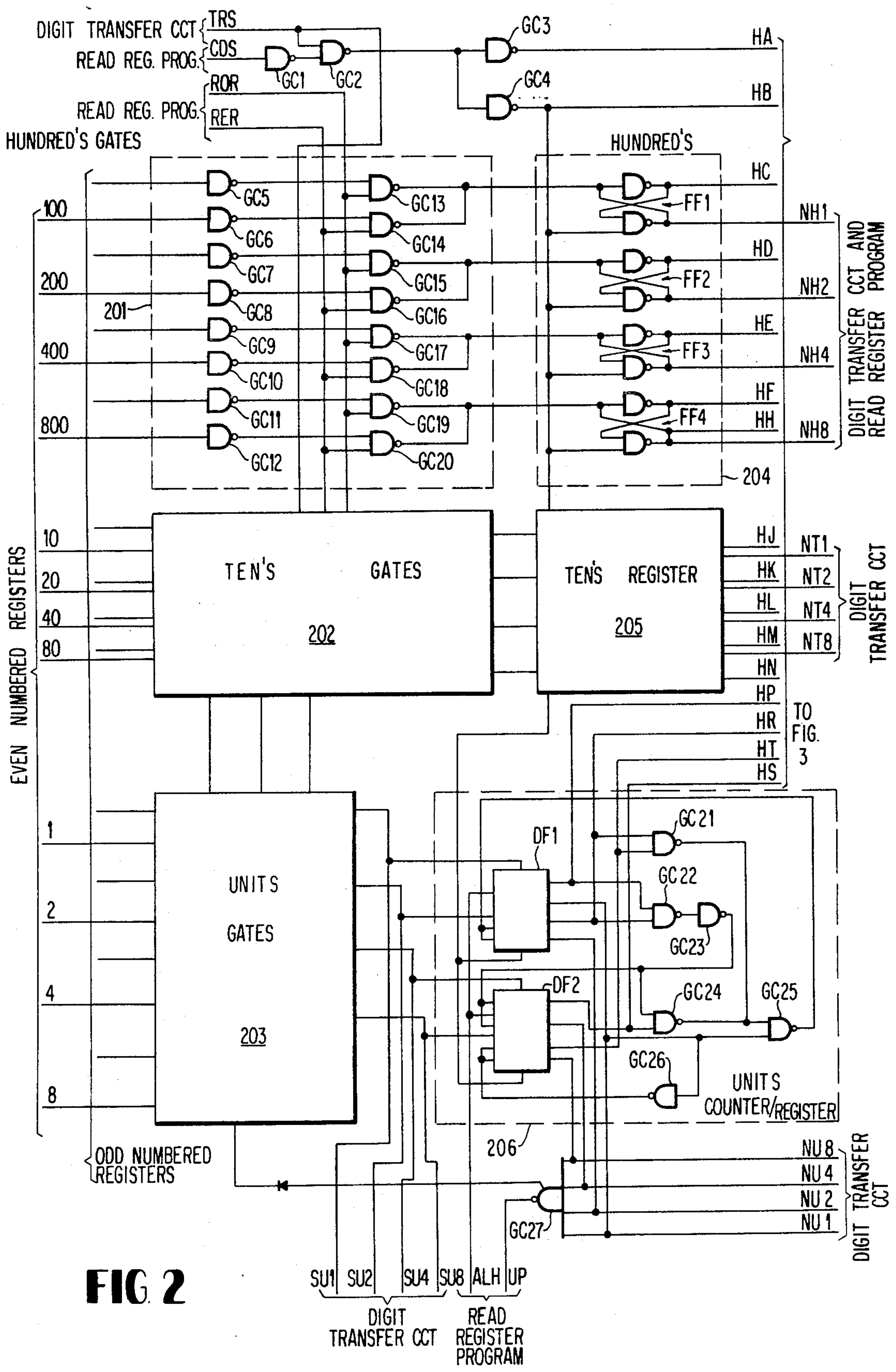
FIG. 2 is a schematic circuit diagram of the portion of the digit-storing circuitry including the gating and register circuitry therein.
Figure 3:
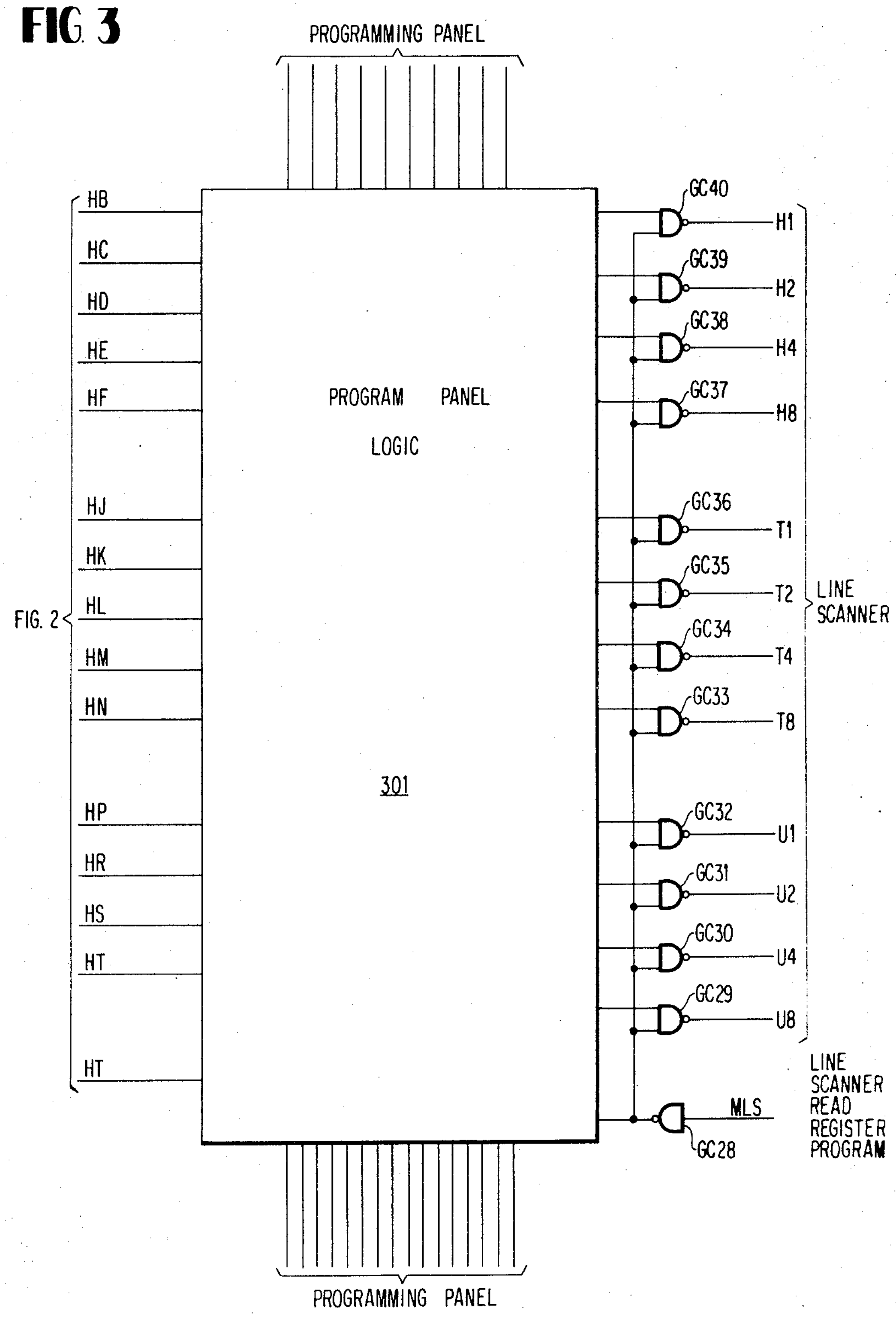
FIG. 3 is also a schematic circuit diagram of a portion of the digit-storing circuit showing the panel logic therefor.

The group hunting circuit of the present invention includes the digit store 125 and the digit transfer 160 shown in the common control portion of FIG. 1. FIGS. 2 and 3 depict the elements of the digit store while FIGS. 4 through 6 make up the digit transfer circuit. The digit store provides for the consecutive hunting of lines, while the non-consecutive hunting is provided by the operation of the digit transfer circuit shown in FIGS. 4 through 6.

As shown in FIG. 2, when digits of a called number are transferred from a register to the digit store portion of the common control, the digits are delivered in binary form to a series of gates 201, 202 and 203 representing, respectively, the hundreds, tens and units digits. Pairs of input lines for the binary coded decimal digits are associated with each gate circuit 210, 202 and 203, since the digits may be received from an even numbered register or an odd numbered register. The hundreds gate circuit 201 is shown in detail and includes gate circuits GC5–GC20. The internal structure of gate circuit 202 and gate circuit 203 is identical to gate circuit 201 and , therefore, these latter gate circuits have been shown in block diagram form. When the binary coded digits are delivered to the inputs of gates 201–203 and the Read Register Program Circuit delivers an "enable" signal on either one of lines ROR or RER, gate circuits 201–203 will deliver the digits to be stored in registers 204–206. The hundreds digit will be stored in latching flip-flops FF1–FF4 which make up hundreds register 204, while the tens and units digits are delivered to registers 205 and 206. The tens register 205 has been shown in block diagram form since this register is of the same form as the hundreds register 204.

As an example of the storage of a hundreds digit 3 from an even numbered register, ground will be delivered over inputs 100 and 200 to gate circuit GC6 and GC8 of hundreds gates 201, respectively. Ground at the input of gate GC6 together with high on RER enables the output of gate GC14 to set latching flip-flop FF1 associated with a binary 1. Ground on the input to gate GC8 together with high on RER causes the output of GC16 to set latching flip-flop FF2 associated with a binary hundreds digit of 2. Thus, hundreds register 204 has stored a hundreds digit of 3. A tens digit is placed in binary storage in a manner identical to that of the hundreds digit.

The storage of the units digits is similar to that of the hundreds and tens digits with the exception that the units register 206 contains a pair of dual flip-flops DF1 and DF2 together with associated gate circuitry GC21–GC26 so as to form a decimal counter. The binary-coded decimal outputs of counter 206 appear on leads HP–HS and leads NU1–NU8.

Associated with units counter/register 206 is a gate circuit GC27 which is connected to receive each of the four binary outputs of register 206. When a three digit number has been dialed, one of the input leads of GC27 will go high (+5v) causing a signal to be delivered on line UP to the read register program, so as to indicate that a three digit code has been dialed and stored. The read register program is also connected to the units counter/storage circuit 206 via input ALH. The purpose of lead ALH is to advance the units counter during consecutive hunting.

As will be explained in detail below, the units counter/storage register 206 is also connected to the digit transfer circuit, shown in FIGS. 4 through 6, through output lines NU1–NU8 and input lines SU1–SU8. The digit store also includes gate circuitry GC1–GC4 as shown in FIG. 2. The gate circuit GC1 together with gate circuits GC2 and GC4 permits a signal delivered from the read register program to be delivered over lead CDS to reset registers 204–206. An input on line TRS from the digit transfer circuit, shown in FIGS. 4 through 6, also resets the flip-flops within registers 204 through 206 to clear the digits therefrom. In addition, lead TRS presents a low signal, via diode CR3, to gate circuit GC27 to maintain a unit present signal UP at the output thereof during the transition period between the cancellation of a number from the storage registers and the insertion of a new number from the digit transfer circuit.

In FIG. 3, the program panel-logic portion of the digit store is depicted. The inputs HA–HT from the storage registers 204–206 of FIG. 2 are connected through the panel logic 301 to gate circuits GC29–GC40, respectively. The particular programming logic of circuit element 301 is connected to the programming panel, the line scanner and read register program as shown and the details thereof, which are not necessary for an understanding of the present invention, have not been shown. The outputs of gates GC29–GC40 provide the binary digits for the units, tens and hundreds dialed digits, respectively. A gate circuit GC28 is also provided to enable the outputs from the digit store to be delivered to the line scanner when a signal is presented on line MLS.

The operation of the digit store in connection with consecutive number hunting will now be described. With registers 204–206 cleared, a signal on one of the leads ROR or RER from the read register program will permit the dialed digits delivered from one of the registers to pass through the gating circuitry 201–203 to be stored in registers 204–206. When a pilot number is dialed, a line hunt class of service indication will be marked on the first line of that particular hunting group. As was previously discussed, the number of lines in a group is normally limited to ten and, therefore, only the units digits is advanced to test the individual lines within the group of 10. The unit counter/register 206 is a decade counter which, after registers 204 through 206 have been loaded with the dialed digits, and if the pilot number is busy, will advance one unit via a signal over line ALH from the read register program. For example, if a three digit pilot number is represented by the digit 213, and that particular line is detected to be busy, the read register program will generate an advance-one signal via lead ALH to the unit counter/register 206. The number then stored in the digit store will be the number 214. If the line associated with that number is found to be busy, another advance line hunt signal will be generated and delivered to the input of counter/register 206. This process continues during a consecutive number hunt until a non-busy line is found or "end of line hunt" line is tested. If all lines in the group are found to be busy, and if no non-consecutive hunt strapping is involved, a busy signal will be returned to the calling party.

It is to be observed that unit register 206 may not be the only register which operates as a counter. If the number of lines associated with a single group were to be expanded to 100, a counter such as that employed in the units counter/register could be substituted for the tens register. Similar substitutions could be made for the hundreds register, with an even larger number of lines per group were desired. However, 10 lines per group is a practical number of lines in present day telephone systems.

With respect to the units counter/register 206, regardless of the value of the initial units digit stored, when the storage counter is advanced to a binary storage of 8 and 2 (units digits zero) the next trigger pulse over line ALH will advance the binary storage within units counter/register 206 to the number 1 (units digit 1). Thus, the pilot number of the line group need not have zero as its units digit. In a ten line group, if the pilot number is designated by the digits 213, the 10th consecutive number in the group would be designated by digits 222. If the number 222 were stored and found to be busy, the "end line hunt class" of service marking at the class of service panel would end the hunt and cause a busy signal to be returned to the calling party. At this point, the read register program would then deliver a signal over line CDS to clear the registers of the digit store.

Of course, the digit store operates in its normal manner where a specific line, which is not associated as a pilot number, is dialed. In other words, if the number identified by the three digits 215, within a group headed by pilot number 213, were dialed and found to be busy, there would be no consecutive hunting, since there would be no "start line hunt" designation on the class of service panel for number 215. Thus, the read register program would deliver no advance signal on line ALH to the units counter/register 206 if the number 215 were found to be busy, when directly dialed.

The circuitry for and the operation of the non-consecutive hunting arrangement will now be discussed in connection with FIGS. 4 through 6 and the counter portion of the digit store shown in FIG. 2. In FIGS. 4, 5 and 6, the following lead designations are employed:

| Lead Designation | Function of Lead |
|---|---|
| NH, NT, NU | Hundred, Ten and Unit digit leads representing the number stored in Digit Store (BCD coded). |
| H. T. U | Same as NH, NT, NU after decoding into decimal form. |
| GHE | Group Hunt Enable |
| DH, DT, DU | Digit Hundred, Digit Ten and Digit Unit leads programmed to represent a new number. |
| DTSR | Digit Transfer Stores Reset |
| SU | Units digit input lead to insert a number into Digit Store. |
| S1, S2, S3, S4, S5, S6 | Leads used to detect existence of "skip from" number. |
| ALH | Advance Line Hunt — 40 sec. pulse. |
| TH1 - TH8 | Translated Hundred Not, digit present in stores. |
| SLH | Start Line Hunt |
| TRS | Digit Store Reset |

Figure 5:
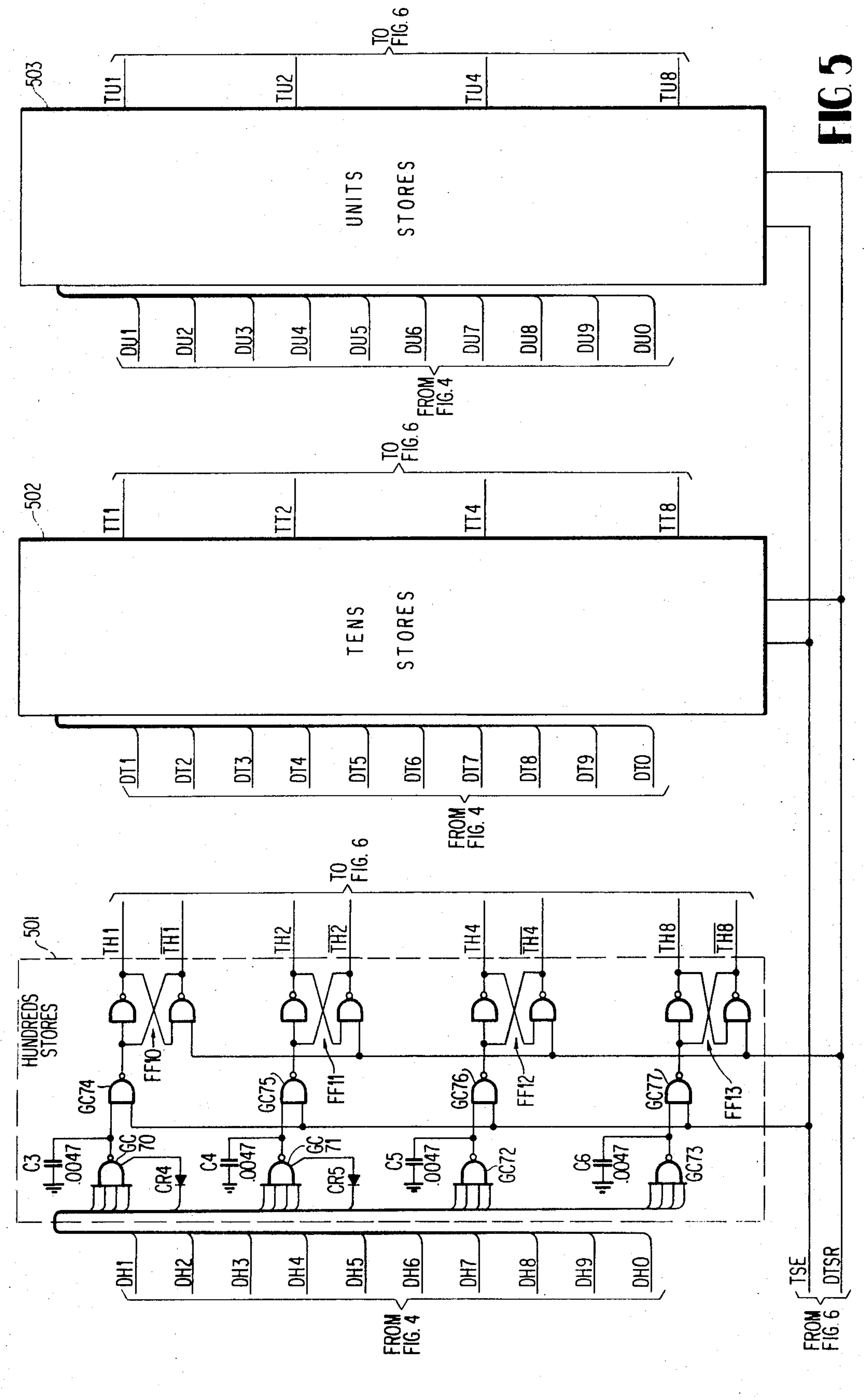
Figure 6:
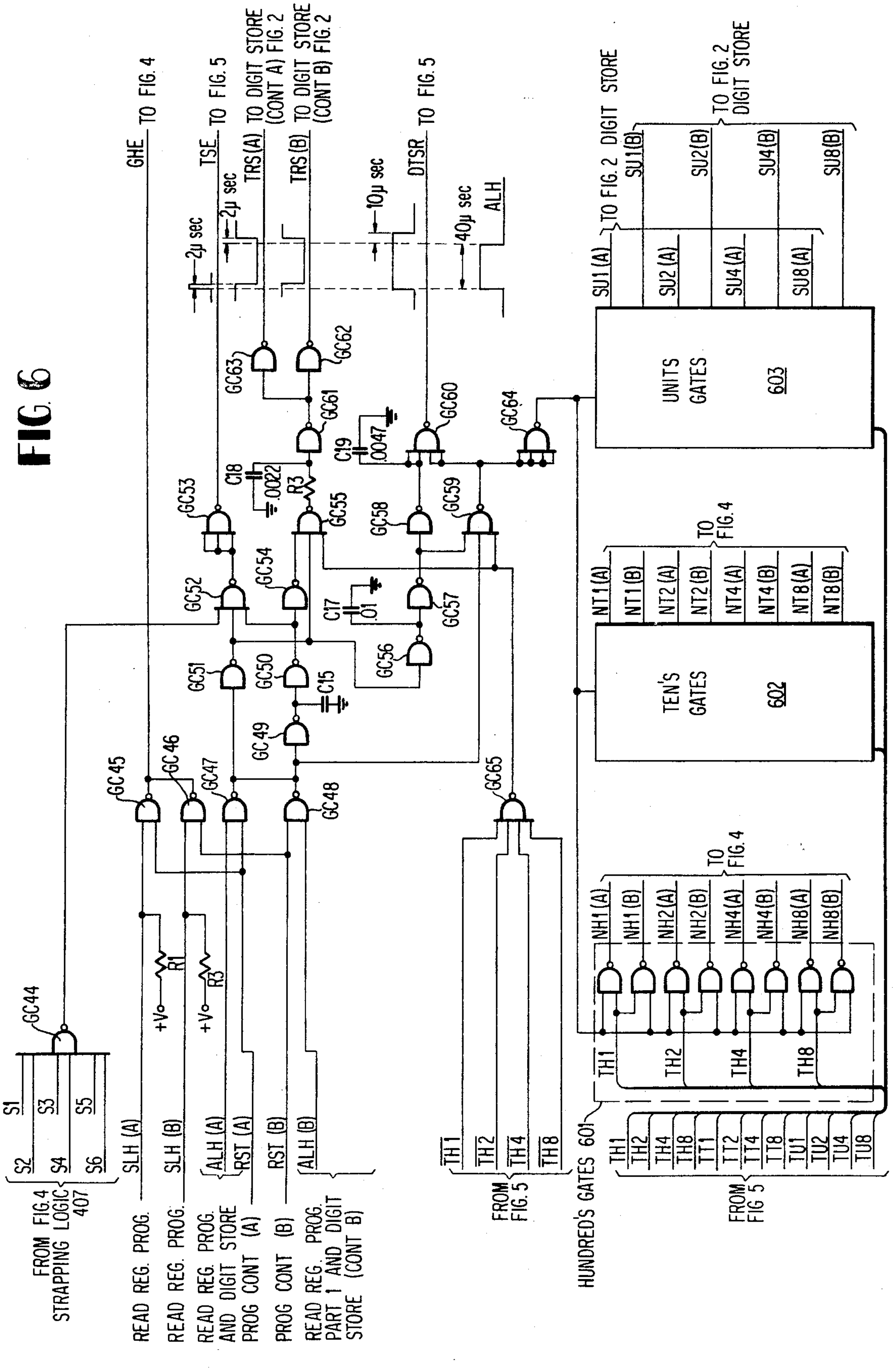

The non-consecutive hunting feature, provided in the digit transfer circuit shown in FIGS. 4 through 6, enables a non-consecutive number hunt to be performed by introducing up to 6 departures from the normal sequential hunt. These departures are designated by "skip from" and "skip to" connections which are programmable and which can augment the consecutive number hunt up to 60 lines. Of course, the invention is not limited to six departures but may employ any number, the number 6 chosen on the basis of the practical needs of present day subscribers.

Whenever a number is stored in the digit store circuit shown in FIG. 2, its digits, in BCD form, appear on leads NH1–NH8, NT1–NT8, and NU1–NU8 at the output of registers 204–206, respectively. These NH, NT and NU leads are shown as inputs of the portions of the digit transfer circuit shown in FIG. 4. The presence of a number is indicated by ground on the corresponding digit leads shown at the input to the binary gates 401, 402 and 403. Binary gates 401–403 and decimal gates 404–406 convert the binary coded decimal outputs from the digits store circuit into decimal form. Each of the binary gates 401–403 is internally identical and only the hundreds binary gate circuit 401 is shown in detail, as these connections are well known to those skilled in the art. Likewise, the 100's decimal gate circuit 404, which provides the decimal outputs for the hundreds digits, is shown in detail while gates 405 and 406 are shown only in block diagram 4. Again, the particular connections of BCD to decimal conversion logic are well known to those skilled in the art and require no specific elaboration. The binary outputs of the digit store which have been converted into decimal form appear on leads H1–H10, T1–T10 and U1–U10, representing the hundreds, tens and units digits respectively. On these leads, the decimally coded number is routed from the "skip from" strapping field to strapping logic 407. The particular interconnections between the "skip from" strapping field and the strapping logic may vary, depending upon which numbers are to be designated as "skip from" numbers in the non-consecutive number hunt. The outputs HT1, TT1, UT1–HT6, TT6, UT6 are connected to the desired inputs of the "skip to" strapping field. As a result of the interconnections between the "skip from" strapping field, the strapping logic 407 and the "skip to" strapping field, programmed skips may be inserted within a consecutive number hunt or within an independent non-consecutive number hunt to provide the desired jumping or skipping between numbers.

The outputs from a "skip to" strapping field are delivered to the digit storage units 501–503 shown in FIG. 5, through connections DH1–DH10, DT1–DT0 and DU1–DU0, respectively. The logic elements 501–503 are internally identical and only the storage and conversion for the hundreds digit are shown in detail. As is clearly apparent to those skilled in the art, each of the conversion and storage units 501–503 converts the decimally coded "skip to" digits into binary form which appear at the outputs TH1–TH8, TT1–TT8 and TU1–TU8 of conversion and storage units 501–503, respectively. An encoding signal is provided on lead TSE to transfer the outputs from the "skip to" strapping field, which have been converted from decimal into BCD form, into the storage flip-flops of the storage units 501–503. At the output of each of the gates GC70–GC73, shown within the conversion and storage unit 501, a capacitor is employed which bypasses short noise pulses so as to eliminate the probability of storing a noise pulse as a legitimate number. Connected to the reset side of each of the flip-flops FF10–FF13 in unit 501 and connected to the corresponding flip-flops in units 502 and 503 is a lead DTSR which resets the storage units when required. The outputs of the conversion and storage units 501–502 are connected to the respective inputs of the gating units 601–603, respectively, shown in FIG. 6.

In FIG. 6, the internal structure of hundreds-gate circuit 601 has been shown in detail while elements 602 and 602 have been shown in block diagram form. The internal structure of blocks 602 and 603 are the same as that of hundreds gate circuit 601, i.e., leads NH1–NH8 and NT1–NT8, are delivered to the inputs of the binary to decimal conversion gates 401–402 and 404–405, shown in FIG. 4, for the hundreds and tens digits. The outputs SU1–SU8 of units gate 603, on the other hand, are connected as auxiliary inputs to the units counter/register 206, shown in FIG. 2. Thus, with the outputs of the conversion and storage units 501–503, shown in FIG. 5, appearing at the inputs of gates 601–603 an enabling gating signal from the output of gate GC64 will cause the outputs of gate circuits 601 and 602 to be delivered to the binary to decimal conversion gates shown in FIG. 4, circuits 401, 402–404, 405, while the output of 603 will be delivered to the digit store as auxiliary inputs to the units counter/register 206. If the number represented by the " skip to" strapping field lies within a consecutive line group, the counter 206 will initiate testing of the lines within this group sequentially until each of the lines in the group has been tested or until another "skip" is detected by the digit transfer circuit. In this manner, with a provision of six "skips" and 10 lines per group, it is possible to provide a consecutive line hunt through 60 lines if a "skip from" is programmed at the 10th line in each group and a "skip to" is programmed or strapped at the first line of another consecutive group of lines. Of course, it is possible to employ consecutive jumps or skips without consecutive hunting and six non-consecutive skips may be provided within a single group of lines if desired. However, such a non-consecutive hunting arrangement would be rather uneconomical.

To provide totally non-consecutive hunting, the first number tested would be strapped as a "skip from" number and every number tested thereafter would be strapped as both a "skip to" and a "skip from" number. Counter 206, shown in FIG. 2, would never advance a digit by counting, since the binary signals representing the units delivered on lines SU1–SU8 would appear immediately at the outputs NU1–NU8, which are connected to the portion of the digit transfer circuit shown in FIG. 4. Strapping logic 407 would then detect another skip and a new "skip to" number would be stored, the units portion being delivered to units counter/register 206.

In order to control the operation of the non-consecutive hunting arrangement, the digit transfer circuit contains a control portion shown in FIG. 6. Timing signals which may aid in the operation of the control circuit are depicted adjacent lines TSE, TRS and DTSR. A gate GC44 is provided to detect the existence of a "skip from" signal appearing on one of the outputs of strapping logic 407, shown in FIG. 4, and delivered to one of the leads S1–S6. When a "skip from" number has been detected and a signal has been delivered on one of the S leads connected to gate circuit GC44, gate circuit GC44 will enable one of the inputs of gate circuit GC52. The other inputs of gate circuit GC52 are connected to the outputs of gate circuits GC51 and GC50. Gate circuits GC51 and GC50 receive signals via gates GC47 and gates GC48–GC49, respectively. Gate circuits GC47 and GC48 receive an Advance Line Hunt signal from the read register program. If the ALH lead goes high, the input of gate circuit GC52, which is connected to the output gate circuit GC51, goes high, while the input of gate circuit GC52 which is connected to the output of gate circuit GC50 goes high and stays high for approximately 2 microseconds due to the delay circuit provided by capacitor C15 connected between the output of gate circuit GC49 and ground. The output of circuit GC52 is inverted and amplified in the power gate GC53 and is delivered via lead TSE to the conversion and storage units 501–503, shown in FIG. 5, so as to enable these units to permit the "skip to" number to be stored, with the units digit inserted in the register/counter 206 of the digit store circuit.

The outputs of gate circuits GC50 and GC51 are also delivered to gate circuit GC55, the output of gate circuit GC50 being inverted through gate circuit GC54, to enable two of the inputs of gate circuit GC55 to go high at the end of the TSE pulse. The other input of gate circuit GC55 is connected to the output of gate circuit GC65, which receives one of the translated hundred-not digits present in the hundreds unit 501. The presence of a signal on one of the input leads TH1–TH8 tells the gate circuit GC65 that the hundreds digit has been transferred into storage. At this time, gate circuit GC65 is enabled and, after a delay provided by delay circuit R3–C18, delivers a low, through gate circuits GC61, GC62 and GC63, on the TRS leads, which are connected to the digit store circuit, shown in FIG. 2. These lows on the TRS leads are delivered to reset the registers 204–206. At the end of the ALH signal, the delay circuit including capacitor C15 holds the TRS lead low for an additional two microseconds.

The operation of the BCD-decimal conversion and strapping of the portion of the digit transfer shown in FIG. 4, which is controlled by a signal on the group hunt enable lead GHE, is controlled by the "start line hunt" signals SLH delivered through either of the respective gate circuits GC45 and GC46 from the read register program.

In order to transfer a number into the cleared storage flip-flop of the digit store circuit, a signal must first appear on the lead DTSR at the output of gate circuit GC60. when the advance line hunt signal ALH is removed from the inputs of gates GC47 and GC48, the output of gate circuit GC51 will be inverted and delayed by the action of gate circuit GC56 and capacitor C17. The delay provided is approximately ten microseconds and the signal is passed through gate circuit GC57 to one of the inputs of gate circuit GC59. The other input of gate circuit GC59 is connected to the output of one of the gates GC47 and GC48. Thus, gate circuit GC59 is satisfied when one of the TH leads is low or the ALH signal is removed. The DTSR signal remains high for an additional 10 microseconds to maintain a reset signal on storage units 501–503, shown in FIG. 5. The signal on lead DTSR is normally low to keep the storage units 501–503 in a cleared condition except in the presence of an Advance Line Hunt signal and for 10 seconds at the end of the ALH signal. The output of gate circuit GC59 is also delivered to the inputs of gate circuit GC64 to enable the storage of the "-skip to" number appearing at the inputs of gate circuits 601–603.

If all of the lines tested during the non-consecutive line hunt are found to be busy (a condition which is very unlikely) in the event that the six "skips" are programmed to provide a 60-line group hunt, a busy signal will be returned to the calling party in the normal manner. It is also possible that one of the "skip to" numbers may be assigned an "end line hunt" class of service to terminate the hunt early. Thus, it is clearly apparent to one skilled in the art that many variations with the interconnections and the sequence of hunting between line is possible through the use of the present invention.

What is claimed is:

1. In a common control telephone system including connections between groups of line circuits, line control circuits, a class of service identification panel for said line circuits, a register for receiving digits of a called line from a subscriber and a common control circuit for controlling the operation of said system, said common control circuit having a group hunting circuit for providing a calling subscriber with a connection line among the lines in at least one group of lines, said group hunting circuit comprising:

means for storing said received digits transferred from said register identifying said called line;

means, responsive to a class of service indication corresponding to said called line, for consecutively hunting through at least one group of lines, including said called line, for a free line, when the line whose identifying digits correspond to said called line is busy; and means, responsive to a condition of one of said lines in said least one group of lines, for hunting through a plurality of lines among said at least one group of lines in a non-consecutive order for a free line, so that said calling subscriber may obtain a connection with one line among the lines in said at least one group of lines.

2. A system, including a group hunting circuit, according to claim 1, further including a program control circuit for providing said group hunting circuit with hunting control signals in response to a class of service indication on said class of service panel, whereby said group hunting circuit will initiate and terminate a group hunt in response to programmed indications associated with specific line circuits marked with specific class of service indications.

3. A system, including a group hunting circuit, according to claim 2, wherein said storing means includes a plurality of gate circuits for transferring in binary form the digits received from said register representing a called line, and a plurality of registers corresponding to said plurality of gates circuits for storing the binary-coded digits representing said called line, transferred by said gate circuits.

4. A system, including a group hunting circuit, according to claim 3, wherein said consecutive hunting means comprises one of said registers, said register being a counter/register capable of counting to a predetermined number of decimal positions.

5. A system, including a group hunting circuit, according to claim 4, wherein the number of said gate circuits and said registers corresponds to the number of digits employed to identify said called line.

6. A system including a group hunting circuit, according to claim 5, wherein said counter/register receives and stores the units digits of the number identifying said called line.

7. A system, including a group hunting circuit, according to claim 2, wherein said non-consecutive hunting means comprises a digit transfer circuit connected to said storing means and said consecutive hunting means, said digit transfer circuit including at least one BCD-decimal converter for converting the digits stored in said storing means into decimal form, means responsive to said decimal digits for defining the order to the non-consecutive hunting, means for converting the decimal digits which define the non-consecutive order of hunting into BCD form and means for inserting said converted BCD digits into said storing means whereby the binary coded digits representing the numbers of the lines to be hunted in a non-consecutive order will be inserted into said storing means in said non-consecutive order and thereby be tested to find a free line in said non-consecutive order.

8. A system, including a group hunting circuit, according to claim 7, wherein said storing means includes a plurality of gate circuits for transferring in binary form the digits received from said register representing a called line, and a plurality of registers corresponding to said plurality of gate circuits for storing the binary-coded digits representing said called line, transferred by said gate circuits.

9. A system, including a group hunting circuit, according to claim 8, whereby one of said registers is a counter/register capable of counting through a predetermined number of decimal positions.

10. A system, including a group hunting circuit, according to claim 9, wherein said counter/register corresponds to the units digits of the number identifying said called line.

11. A system, including a group hunting circuit, according to claim 9, wherein the number of BCD-decimal converters, decimal-to-BCD converters and BCD digit inserting means corresponds to the number of digits employed in identifying a called line.

12. A system, including a group hunting circuit, according to claim 11, where the outputs of at least one of said BCD digit inserting means are connected as auxiliary inputs to said counter/register, whereby said non-consecutive order of hunting may include consecutive hunting amount lines of a group through the advancing of the count of said counter/register.

13. A system, including a group hunting circuit, according to claim 7, wherein said non-consecutive order defining means comprises a "skip from" strapping field connected to said BCD-decimal converting means, a strapping logic circuit connected to said "skip from" strapping field for detecting a skip during a line hunt, and a "skip to" strapping field connected between said strapping field logic circuit and said decimal-BCD converting means, whereby those line numbers to be tested during the non-consecutive hunt may be detected.

14. A system, including a group hunting circuit, according to claim 12, wherein said non-consecutive order defining means comprises a "skip from" strapping field connected to said BCD converting means, a strapping logic circuit connected to said "skip from" strapping field for detecting a skip during a line hunt, and a "skip to" strapping field connected between said strapping field logic circuit and said decimal-BCD converting means whereby those line numbers to be tested during a non-consecutive hunt may be detected.

15. A system, including a group hunting circuit, according to claim 1, further including a digit transfer control circuit for controlling the operation of said storing, consecutive and non-consecutive line hunt means.

16. A system, including a group hunting circuit, according to claim 14, further including a first digit transfer control logic circuit responsive to the output of said strapping logic circuit for delivering signals to said BCD converting means to enable said BCD digit inserting means to insert said converted BCD digits into said storing means.

17. A system, including a group hunting circuit according to claim 16, wherein said strapping logic circuit is provided with a predetermined number of skip output terminals corresponding to the number of skips which may be employed during a non-consecutive line hunt, said predetermined number of skip output terminals being connected to said first digit transfer control logic circuit whereby, whenever a control skip signal is delivered by said strapping logic on one of said predetermined number of output terminals, the contents of said at least one of said BCD inserting means may be delivered as an auxiliary input to said counter/register.

18. A system, including a group hunting circuit, according to claim 17, wherein said digit transfer control logic circuit further includes a second control logic circuit responsive to the output of said program control circuit for delivering line hunt control signals to said BCD-decimal converting means and to said strapping logic, so as to enable said BCD-decimal converting means and said strapping logic to test for the programming of a non-consecutive line hunt.

19. A system, including a group hunting circuit, according to claim 18, wherein said digit transfer control logic circuit further includes a third control logic circuit, responsive to the output of said decimal BCD-conversion means and to the output of said program control circuit, for enabling said BCD inserting means, whereby said converted digits appearing at the inputs of said inserting means will be stored.

20. A system, including a group hunting circuit, according to claim 19, wherein said third control logic circuit includes a first gate circuit connected to the output of said decimal-BCD conversion means, a second gate circuit connected to the output of said program control circuit, a first delay-gate circuit connected to the output of said second gate circuit and a fourth gate circuit connected to the output of said first gate circuit, said second gate circuit and said first delay-gate circuit, the output of said fourth gate circuit being connected to said BCD-inserting means, for enabling the storing of said converted digits for a delayed period of time determined by said first delay-gate circuit.

21. A system, including a group hunting circuit, according to claim 20, wherein said digit transfer control logic circuit further includes a digit transfer reset gate circuit connected to said first delay-circuit and to said fourth gate circuit for delivering a reset signal to said decimal-BCD conversion means.

22. A system, including a group hunting circuit, according to claim 20, wherein said digit transfer control logic circuit further includes a fourth control logic circuit, responsive to the output of said second gate circuit and said first control logic circuit, for enabling said decimal-BCD conversion means during said non-consecutive line hunt.

23. A system, including a group hunting circuit, according to claim 22, wherein said fourth control logic circuit includes a second delay-gate circuit connected to the output of said second gate circuit for controlling the duration of the enabling of said decimal BCD conversion means.

24. A system, including a group hunting circuit, according to claim 23, wherein said digit transfer control logic circuit further controls a fifth control logic circuit responsive to said first gate circuit, said second gate circuit and said second delay-gate circuit for providing a storage clear signal to said storage registers in said storing means.

25. A system, including a group hunting circuit, according to claim 6, further including a read register program logic circuit for delivering a storage indication signal to said read register program upon the storage of a digit in said counter/register.

26. In a common control telephone system including connections between groups of line circuits, line control circuits, a class of service identification panel for said line circuits, a register for receiving digits of a called line from a subscriber and a common control circuit for controlling the operation of said system, said common control circuit having a group hunting circuit for providing a calling subscriber with a connection to a line among the lines in at least one group of lines, said group hunting circuit comprising:

means for storing said received digits transferred from said register identifying said called line;

means, responsive to a class of service indication corresponding to said called line, for consecutively hunting through at least one group of lines, including said called line, for a free line, when the line whose identifying digits correspond to said called line is busy; and a program control circuit for providing said group hunting circuit with hunting control signals in response to a class of service indication on said class of service panel, whereby said group hunting circuit will initiate and terminate a group hunt in response to programmed indications associated with specific line circuits marked with specific class of service indications.

27. A system, including a group hunting circuit, according to claim 26, wherein said storing means includes a plurality of gate circuits for transferring in binary form the digits received from said register representing a called line, and a plurality of registers corresponding to said plurality of gates circuits for storing the binary-coded digits representing said called line, transferred by said gate circuits.

28. A system, including a group hunting circuit, according to claim 27, wherein said consecutive hunting means comprises one of said registers, said register being a counter/register capable of counting to a predetermined number of decimal positions.

29. A system, including a group hunting circuit, according to claim 28, wherein the number of said gate circuits and said registers corresponds to the number of digits employed to identify said called line.

30. A system, including a group hunting circuit, according to claim 29, wherein said counter/register receives and stores the units digits of the number identifying said called line.

31. In a common control telephone system including connections between groups of line circuits, line control circuits, a class of service identification panel for said line circuits, a register for receiving digits of a called line from a subscriber and a common control circuit for controlling the operation of said system, said common control circuit having a group hunting circuit for providing a calling subscriber with a connection to a line among the lines in at least one group of lines, said group hunting circuit comprising:

means for storing said received digits transferred from said register identifying said called line;

means, responsive to a condition of one of said lines in at least one group of lines, for hunting through a plurality of lines in a non-consecutive order for a free line;

a program control circuit for providing said group hunting circuit with hunting control signals in response to a class of service indication on said class of service panel, whereby said group hunting circuit will initiate and terminate a group hunt in response to programmed indications associated with specific line circuits marked with specific class of service indications so that said calling subscriber may obtain a connection with one line among the line in said plurality of lines.

32. A system, including a group hunting circuit, according to claim 31, wherein said non-consecutive hunting means comprises a digit transfer circuit connected to said storing means, said digit transfer circuit including at least one BCD-decimal converter for converting the digits stored in said storing means into decimal form, means response to said decimal digits for defining the order of the non-consecutive hunting, means for converting the decimal digits which define the non-consecutive order of hunting into BCD form and means for inserting said converted BCD digits into said storing means whereby the binary coded digits representing the numbers of the lines to be hunted in a non-consecutive order will be inserted into said storing means in said non-consecutive order and thereby be tested to find a free line in said non-consecutive order.

33. A system, including a group hunting circuit, according to claim 32, wherein said storing means includes a plurality of gate circuits for transferring in binary form the digits received from said register representing a called line, and a plurality of registers corresponding to said plurality of gate circuits for storing the binary-coded digits representing said called line, transferred by said gate circuits.

34. A system, including a group hunting circuit, according to claim 32, wherein said non-consecutive order defining means comprises a "skip from" strapping field connected to said BCD-decimal converting means, a strapping logic circuit connected to said "skip from" strapping field for detecting a skip during a line hunt, and a "skip to" strapping field connected between said strapping field logic circuit and said decimal-BCD converting means, whereby those line numbers to be tested during the non-consecutive hunt may be detected.

35. A system, including a group hunting circuit, according to claim 33, wherein said non-consecutive order defining means comprises a "skip from" strapping field connected to said BCD converting means, a strapping logic circuit connected to said "skip from" strapping field for detecting skip during a line hunt, and a "skip to" strapping field connected between said strapping field logic circuit and said decimal-BCD converting means whereby those line numbers to be tested during a non-consecutive hunt may be detected.

36. A system, including a group hunting circuit, according to claim 35, further including a first digit transfer control logic circuit responsive to the output of said strapping logic circuit for delivering signals to said BCD converting means to enable said BCD digit inserting means to insert said converted BCD digits into said storing means.

37. A system, including a group hunting circuit, according to claim 36, wherein said strapping logic circuit is provided with a predetermined number of skip output terminals corresponding to the number of skips which may be employed during a non-consecutive line hunt, said predetermined number of skip output terminals being connected to said first digit transfer control logic circuit whereby, whenever a control skip signal is delivered by said strapping logic on one of said predetermined number of output terminals, the contents of said at least one of said BCD inserting means may be delivered as an auxiliary input to a counter/register included among said plurality of said registers.

* * * * *

UNITED STATES PATENT AND TRADEMARK OFFICE

CERTIFICATE OF CORRECTION

PATENT NO. : 3,723,659

DATED : March 27, 1973

INVENTOR(S) : Ignas Budrys and Ernest O. Lee, Jr.

It is certified that error appears in the above-identified patent and that said Letters Patent are hereby corrected as shown below:

| | |
|---|---|
| Col. 4, line 33 | "wit" should read ---with---. |
| Col. 5, line 54 | "of class" should read ---class of---. |
| Col. 6, line 9 | "210" should read ---201---. |
| Col. 8, line 53 | "TH1-TH8" should read ---$\overline{TH1}$-$\overline{TH8}$--- |
| Col. 11, line 23 | "TH1-TH8" should read ---$\overline{TH1}$-$\overline{TH8}$--- |
| line 45 | "when" should read ---When---. |
| Col. 13, line 45 | "amount" should read ---among---. |

Signed and Sealed this

*eighteenth* Day of *November 1975*

[SEAL]

*Attest:*

RUTH C. MASON
*Attesting Officer*

C. MARSHALL DANN
*Commissioner of Patents and Trademarks*